(12) United States Patent
Obernyer et al.

(10) Patent No.: US 9,118,065 B2
(45) Date of Patent: Aug. 25, 2015

(54) LEAD-OXIDE BATTERY PLATE WITH NONWOVEN GLASS MAT

(75) Inventors: Kristin F. G. Obernyer, Denver, CO (US); David E. Weller, Littleton, CO (US)

(73) Assignee: Johns Manville, Denver, CO (US)

( * ) Notice: Subject to any disclaimer, the term of this patent is extended or adjusted under 35 U.S.C. 154(b) by 468 days.

(21) Appl. No.: 12/788,593

(22) Filed: May 27, 2010

(65) Prior Publication Data

US 2011/0293988 A1    Dec. 1, 2011

(51) Int. Cl.
| | |
|---|---|
| *H01M 4/20* | (2006.01) |
| *H01M 4/36* | (2006.01) |
| *H01M 4/62* | (2006.01) |
| *H01M 4/73* | (2006.01) |

(52) U.S. Cl.
CPC ............... *H01M 4/20* (2013.01); *H01M 4/366* (2013.01); *H01M 4/62* (2013.01); *H01M 4/73* (2013.01); *Y02E 60/126* (2013.01)

(58) Field of Classification Search
USPC .................................. 429/225–228, 129–147
See application file for complete search history.

(56) References Cited

U.S. PATENT DOCUMENTS

| | | | |
|---|---|---|---|
| 4,262,068 A | 4/1981 | Kono et al. | |
| 4,336,314 A | 6/1982 | Yonezu et al. | |
| 4,359,511 A | 11/1982 | Strzempko | |
| 4,363,856 A * | 12/1982 | Waterhouse | 429/143 |
| 4,499,929 A * | 2/1985 | Shima et al. | 141/1.1 |
| 4,529,677 A | 7/1985 | Bodendorf | |
| 4,606,982 A * | 8/1986 | Nelson et al. | 429/59 |
| 5,221,587 A * | 6/1993 | Bohnstedt et al. | 429/145 |
| 6,071,641 A * | 6/2000 | Zguris | 429/144 |
| 6,143,441 A * | 11/2000 | Zguris et al. | 429/144 |
| 6,306,539 B1 | 10/2001 | Zguris | |
| 6,531,248 B1 | 3/2003 | Zguris et al. | |
| 7,288,338 B2 | 10/2007 | Zguris | |
| 2009/0148760 A1 | 6/2009 | Justice | |

FOREIGN PATENT DOCUMENTS

| | | |
|---|---|---|
| EP | 1 533 861 A1 | 5/2005 |
| FR | 2 937 799 A1 | 4/2010 |
| GB | 873 567 A | 7/1961 |

OTHER PUBLICATIONS

Product information of Kuraray fibers of N720, Engineered fibers technology printed Aug. 9, 2014 http://www.eftfibers.com/prod_k-PET.php.*

* cited by examiner

*Primary Examiner* — Maria J Laios
(74) *Attorney, Agent, or Firm* — Robert D. Touslee

(57) ABSTRACT

Provided is a lead-oxide pasted battery plate comprising a lead alloy grid, lead oxide paste and a nonwoven glass fiber mat. The nonwoven glass mat is comprised of glass fibers having a diameter greater than 10 microns, a binder for the glass fibers, and a third component. The third component can comprise cellulosic fibers, glass micro-fibers, polymeric fibers, fillers or mixtures thereof. The presence of the third component restricts the penetration of the lead oxide paste through the thickness of the mat during the plate pasting operation, thereby keeping the process equipment free from the accumulation of lead oxide paste. The component can then dissolve in the battery acid solution, or work synergistically with the battery separator to deliver electrolyte to the lead oxide plate during the operation of the battery.

6 Claims, 1 Drawing Sheet

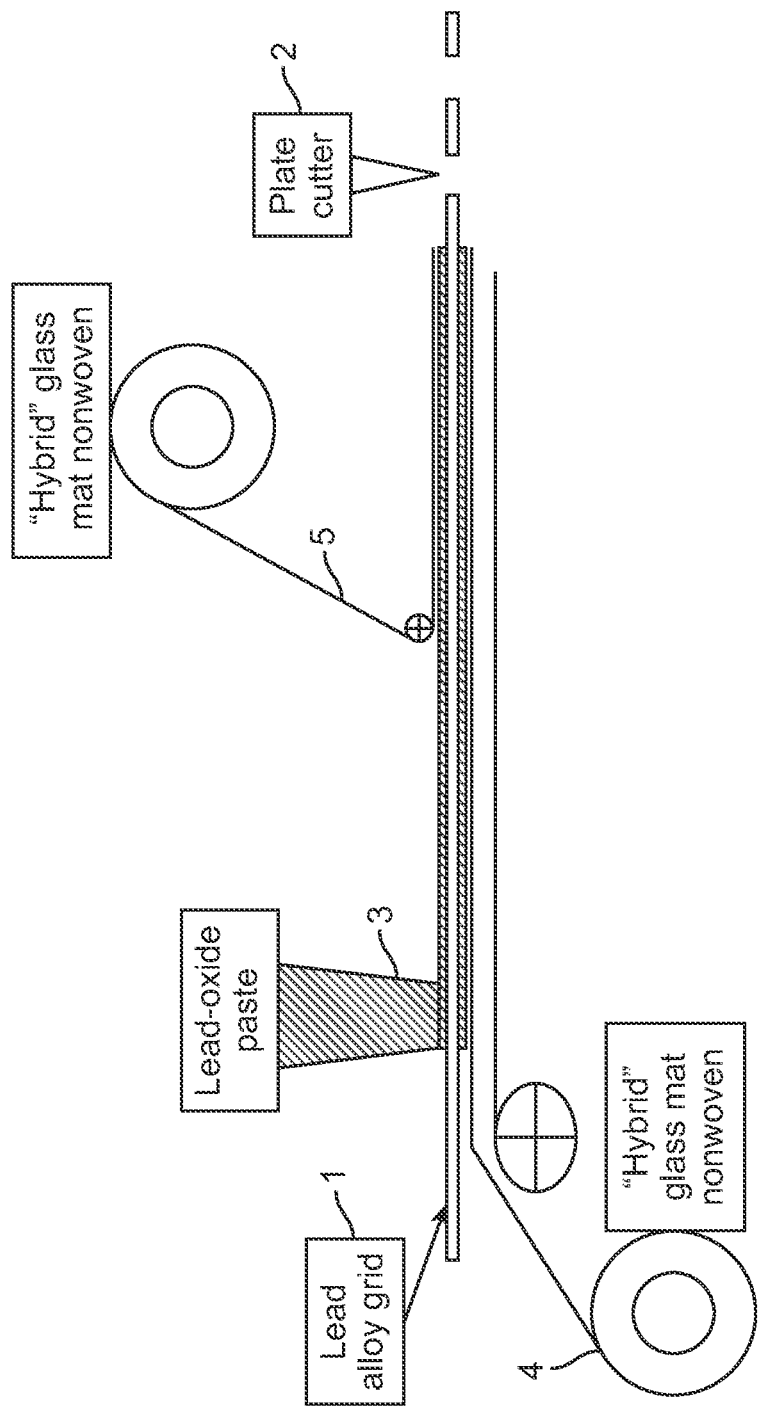

LEAD-OXIDE BATTERY PLATE WITH NONWOVEN GLASS MAT

BACKGROUND OF THE INVENTION

1. Field of the Invention

The present invention relates to an improvement in a pasted type lead-acid battery. More particularly, the invention relates to a method for producing a pasted type lead-acid battery plate.

2. Description of the Related Art

A pasted type lead-acid battery has a superior discharge capacity and especially a high rate discharge capacity when compared to a tubular type lead-acid battery. Therefore, these batteries have been extensively used as a drive power source in electric vehicle and the like. However, if deep discharge is repeatedly carried out, the service life of a pasted type lead-acid battery is shorter than that of a tubular type lead-acid battery. Furthermore, in a pasted type lead-acid battery, the weight of certain components, such as its grids which do not relate to the charge or discharge reaction, is reduced in order to increase the energy density of the battery. As a result, the structural supporting capability of the grid for the active material is decreased and the battery's service life is reduced accordingly. On the other hand, improvement of active material utilization may effectively increase the energy density but, unfortunately, the improvement cannot be achieved without reducing the service life of the battery for cycle use. Thus, if the energy density of a pasted type lead-acid battery is increased, then the service life in cycle use correspondingly decreases.

The service life in cycle use of a pasted type lead-acid battery is, in general, primarily dependent on the service life of the positive plates. Accordingly, in order to increase the service life of a pasted type lead-acid battery, it is essential that the service life of the positive plates be increased. Capacity loss of the pasted type positive plates during a charge-discharge cycle is attributed to the fact that the active material is softened and accordingly sheds. That is, the volume of the positive plate active material ($PbO_2$) is changed by charge and discharge. More specifically, when the active material $PbO_2$ is changed into $PbSO_4$ through discharge, the molecular volume increases by a factor of 1.92. In contrast, during the charge $PbSO_4$ changes to $PbO_2$ and the volume of the material contracts by a factor of 1/1.92. However, it should be noted that the volume change in the active material layer due to charge and discharge is not reversible. In other words, as the charge and discharge is repeated, the plate is gradually expanded as a result of which large pores or voids are formed in the active material and the plate becomes more porous. As the porosity increases, the cohesion of the active material particles is gradually lowered thereby reducing electrical contact to the active material particles which decreases the capacity of the positive plates. In this condition, the active material layer is softened, and shedding of the active material particles from the plate results. This causes the successive degradation of the positive plate during deep charge and discharge cycle use.

In order to develop an electric vehicle which has an acceptable performance and is economical, it is essential to provide a lead-acid battery which has a high energy and power density and has a long cyclic charge and discharge life. In order to accomplish this, it is necessary to provide a pasted type positive plate which has a long service life.

In order to improve the service life for cycle use of a pasted type lead-acid battery, it is necessary to prevent structural change of the positive active material due to charge and discharge, specifically, the expansion thereof. There are a variety of currently available techniques for preventing the expansion of the active material. In one of the known techniques which can be applied to the pasted type positive plate, cloth made of glass or synthetic fibers having an acid resistance is wrapped around the surface of the plate or it is placed over the surface of the plate so as to apply pressure to the active material surface. In another technique, a bag is formed using such a cloth, and the positive plate is disposed inside the bag similar to the tubular type plate. These techniques may be effective in preventing shedding of the positive active material particles from the plate when the cohesion of the positive active material particles is reduced. However, these techniques do little to prevent the expansion of the active material and, accordingly, cannot effectively increase the service life of the battery as is desired.

In a typical conventional technique, a porous material such as a glass mat having some flexibility is disposed under pressure in contact with the surface of the positive plate. With this technique, a pressure of 5 to 20 $kg/dm.sup.2$ is typically applied to an assembled element in the dry state. The service life of a pasted type lead-acid battery using such a glass mat is longer than that of a pasted type lead-acid battery without a glass mat. However, it is still much shorter than that of tubular type lead-acid battery. Thus, it can be understood that the deep charge and discharge life cannot be sufficiently increased merely by using a glass mat.

Glass and paper mats have found a usefulness in the manufacturing of the lead-oxide battery plate. The use of paper as a means to improve the manufacturing process for applying lead oxide past to the grid of a lead-acid battery plate is well known in the lead-acid battery industry. A number of nonwovens have been evaluated as substitutes for the light-weight, low-cost pasting paper that is widely used, generally without success. Recently, a light-weight, low-cost chemically-resistant glass mat nonwoven has delivered sufficient processing improvements to merit adoption by a major battery manufacture. In addition to the processing benefits derived from the use of a pasting paper, the chemically-resistant glass mat reinforces the lead oxide paste, enabling it to better withstand the expansive and contractive stresses incurred during discharge and recharge, thereby increasing the life of the battery, as discussed above. However, improvement in the manufacturing process and the performance of lease oxide battery plates and the overall battery are continually sought.

SUMMARY OF THE INVENTION

Provided is a lead-oxide pasted battery plate comprising a lead alloy grid, lead oxide paste and a nonwoven glass fiber mat. The nonwoven glass mat is comprised of glass fibers having a diameter greater than 10 microns, a binder for the glass fibers, and a third component. The third component can comprise cellulosic fibers, glass micro-fibers, polymeric fibers, fillers or mixtures thereof. The presence of the third component restricts the penetration of the lead oxide paste through the thickness of the mat during the plate pasting operation, thereby keeping the process equipment free from the accumulation of lead oxide paste. The component can then dissolve in the battery acid solution, or work synergistically with the battery separator to deliver electrolyte to the lead oxide plate during the operation of the battery.

BRIEF DESCRIPTION OF THE FIGURE OF THE DRAWING

The FIGURE schematically shows a process for preparing a lead oxide battery plate in one embodiment of the present invention.

DETAILED DESCRIPTION OF THE PREFERRED EMBODIMENTS

A "hybrid" nonwoven glass mat for lead-acid battery pasting plate applications would deliver additional processing or performance advantages over prior nonwoven glass mat products as well as traditional pasting papers. The foundation of the "hybrid" product construction of the present invention is the network of large diameter, i.e., greater than 10 micron, for example, from about 11-16 micron diameter, chemically-resistant glass fibers, bonded together with a chemically-resistant binder, e.g., an acrylic binder, that delivers the durability to survive in the acid environment throughout the life of the battery, the strength to survive the plate pasting operation and the permeability to enable paste penetration. The "hybrid" functionality is delivered via one or more additional components, typically fibers or fillers, that are well (homogeneously) dispersed among the two primary components or alternatively delivered in an intentionally stratified configuration (gradient/layered construction).

Although only two "hybrid" formulations are described herein, a large number of combinations would be available to one skilled in the art.

In one embodiment, the "hybrid" formulation incorporates a cellulosic fiber as a tertiary component in order to decrease and optimize the initial permeability of the "hybrid" battery mat such that it resists and restricts the penetration of the lead oxide paste through the thickness of the mat during the plate pasting operation, thereby keeping the process equipment free from the accumulation of the lead oxide paste. The cellulosic component can later dissolve in the battery acid solution thereby providing direct access for the electrolyte to the lead oxide plate.

In another embodiment, the "hybrid" formulation incorporates a chemically-resistant glass micro-fiber, i.e., less than one micron in diameter, for example, from about 0.3-0.5 micron diameter, of the same composition and morphology as used in typical absorptive glass mat (AGM) separator products, to deliver the dual benefits of decreasing/optimizing the permeability of the "hybrid" battery mat in order to realize the previously described processing benefits while also working synergistically with a battery separator via capillary action to deliver the starved electrolyte to the lead oxide plate during the operation of the battery.

Polymeric fibers and fillers can also be used in combination with the glass fibers and binder. Of particular interest is a formulation comprising the large diameter glass fibers, micro glass fibers and polymeric and/or filler materials. Such a combination has been found to provide excellent properties and advantages.

Any suitable polymeric fibers can be incorporated into the "hybrid" formulation. The polymeric fibers can comprise, for example, polyolefin fibers, such as polypropylene and polyethylene fibers, polyester fibers such as polyethylene terephthlate fibers, and polystyrene fibers. Mixtures of fibers can be used, as can bi-component fibers. Fibers extruded with two different polymers are useful. The bi-component nature can be side-by-side or core/sheath. Furthermore, additives can be present in the polymers to help improve battery performance.

The fillers useful in the practice of the invention are those which are particulate fillers having an average particle size of 0.02 to 20 microns, such as kaolinite, halloysite, montmoritonite, tinite and illite which are all clays, and other fillers such as silica, quartz, calsite, luminite, gypsum, muscavite, diatomaceous earth and the like. In addition to the inorganic fillers, organic fillers having a particle size of 0.2 to 50 microns may also be used for the same purpose as the inorganic fillers. These organic fillers are typically inert thermoplastic organic polymers such as hydrocarbon polymer powders. Typical polymers are polystyrene and polyolefin polymers and copolymers. The fillers reduce the ohmic resistance and pore size along with the cost of the battery separator material.

The chemically resistant binder employed is generally an organic binder, preferably supplied as a latex or aqueous dispersion. Preferably, the binder is the polymer of monoethylenically unsaturated monomers. "Monoethylenically unsaturated," as used herein, is characterized by the monomer having a $>C=CH_2$ group. These monoethylenically unsaturated monomers are, but not limited to, the acrylic monomers such as methacrylic acid, acrylic acid, acrylonitrile, methacrylonitrile, methylacrylate, methylmethacrylate, ethylacrylate, ethylmethacrylate, acrylamide and the like; olefin hydrocarbons such as ethylene, butylene, propylene, styrene, alpha-methylstyrene and the like; and other functional unsaturated monomers such as vinyl pyridine, vinyl pyrollidone and the like. Typically, these polymers are acrylic polymers dispersed in water at a level of 30 to 50 percent by weight and are in the form of a latex, and are film forming.

Although the polymers useful in the practice of the invention may be provided with sufficient functional groups to self-crosslink, i.e. crosslink without the addition of other materials, crosslinking agents may be added to provide the required crosslinking characteristics. Preferably, the polymers will crosslink at a temperature below 200° F., for example, in a range of from about 150° F. to 190° F.

The process of preparing the battery plate comprises applying a lead oxide paste to the grid of a lead alloy battery plate. The nonwoven glass mat of the present invention is then applied to both sides of the grid. The nonwoven glass mat can comprise any of the combinations described above. The battery plate is then cut to size. Reference to the FIGURE of the Drawing can further illustrate the present process.

Referring to the FIGURE of the Drawing, a lead alloy grid 1 is transported on a conveyor toward a plate cutter 2. Lead-oxide paste is added to the grid at 3. A nonwoven glass mat 4 in accordance with the present invention is provided for the bottom of the grid and 5 for the top of the grid. The plate cutter 2 then cuts the grid into individual plates.

Although embodiments of the invention have been described with reference to specific compositions and processes, the invention is only to be limited so far as is set forth in the accompanying claims.

That which is claimed is:

1. A lead-oxide pasted battery plate comprising:
   a lead alloy grid,
   lead oxide paste, and
   a nonwoven glass mat comprised of:
   glass fibers having a diameter of greater than 10 microns,
   glass micro-fibers having a diameter of less than 1 micron,
   a binder, and
   particulate fillers having an average particle size of 0.2 to 50 microns, wherein the glass fibers and glass micro-fibers are homogeneously dispersed throughout the nonwoven glass mat.

2. The battery plate of claim 1, wherein the nonwoven glass mat further comprises polymer fibers.

3. The battery plate of claim 1, wherein the glass fibers of the nonwoven glass mat have a diameter within the range of from about 11 to 16 microns.

4. A process of preparing the battery plate, comprising
providing a grid of a lead alloy battery plate,
applying lead oxide paste to the grid of a lead alloy battery plate,
applying a first nonwoven glass mat above the grid,
applying a second nonwoven glass mat below the grid, and
cutting the plate, wherein the first and/or second nonwoven glass mat includes:
  glass fibers having a diameter of greater than 10 microns,
  glass micro-fibers,
  a binder, and
  particulate fillers having an average particle size of 0.2 to 50 microns,
wherein the glass fibers and glass micro-fibers are homogeneously dispersed throughout the glass mat.

5. The process of claim 4, wherein the glass mat further comprises polymer fibers.

6. The process claim 4, wherein the glass fibers of the glass mat have a diameter within the range of from about 11 to 16 microns.

* * * * *